United States Patent
Michaels

(10) Patent No.: US 11,101,670 B2
(45) Date of Patent: Aug. 24, 2021

(54) WIRELESS CHARGING CART

(71) Applicant: SECTOR 5, INC., Temecula, CA (US)

(72) Inventor: Peter Michaels, Temecula, CA (US)

(73) Assignee: SECTOR 5, INC.

( * ) Notice: Subject to any disclaimer, the term of this patent is extended or adjusted under 35 U.S.C. 154(b) by 165 days.

(21) Appl. No.: 16/564,137

(22) Filed: Sep. 9, 2019

(65) Prior Publication Data
US 2020/0083724 A1 Mar. 12, 2020

Related U.S. Application Data

(60) Provisional application No. 62/728,513, filed on Sep. 7, 2018.

(51) Int. Cl.
*H01M 10/46* (2006.01)
*H02J 7/00* (2006.01)
*B62B 3/00* (2006.01)
*H02J 7/02* (2016.01)

(52) U.S. Cl.
CPC ............ *H02J 7/0027* (2013.01); *B62B 3/005* (2013.01); *H02J 7/0044* (2013.01); *H02J 7/025* (2013.01)

(58) Field of Classification Search
CPC ........ H02J 7/0044; H02J 7/0042; H02J 50/10; H02J 50/90; B62B 3/005; B62B 3/003; B62B 2202/56

USPC ............ 320/107, 108, 114, 115; 211/26, 36, 211/70.6, 102, 187

See application file for complete search history.

(56) References Cited

U.S. PATENT DOCUMENTS

| | | | |
|---|---|---|---|
| 2009/0153098 A1* | 6/2009 | Toya ..................... | H02J 7/0042 320/108 |
| 2011/0014501 A1* | 1/2011 | Scheucher .............. | B60K 1/04 429/7 |
| 2017/0027079 A1* | 1/2017 | Dombrowski ........... | H02J 5/00 |
| 2017/0136898 A1* | 5/2017 | Ahmadi .................. | B60L 53/36 |

* cited by examiner

*Primary Examiner* — Edward Tso
(74) *Attorney, Agent, or Firm* — Welsh Flaxman & Gitler LLC

(57) ABSTRACT

A wireless charging cart for charging the battery of portable computing devices having a receiver includes a shelf and a divider supported by the shelf. The divider has a top edge and a bottom edge between which an x-axis extends and a front edge and rear edge between which a y-axis extends. The cart further has a charging module mounted to the divider. The charging module has a transmitter mounted to an adjustable support, which permits the transmitter to be moved along both the x and y axis of the divider, wherein the adjustable support is adapted to locate the transmitter adjacent the receiver of the portable computing device to be charged.

5 Claims, 16 Drawing Sheets

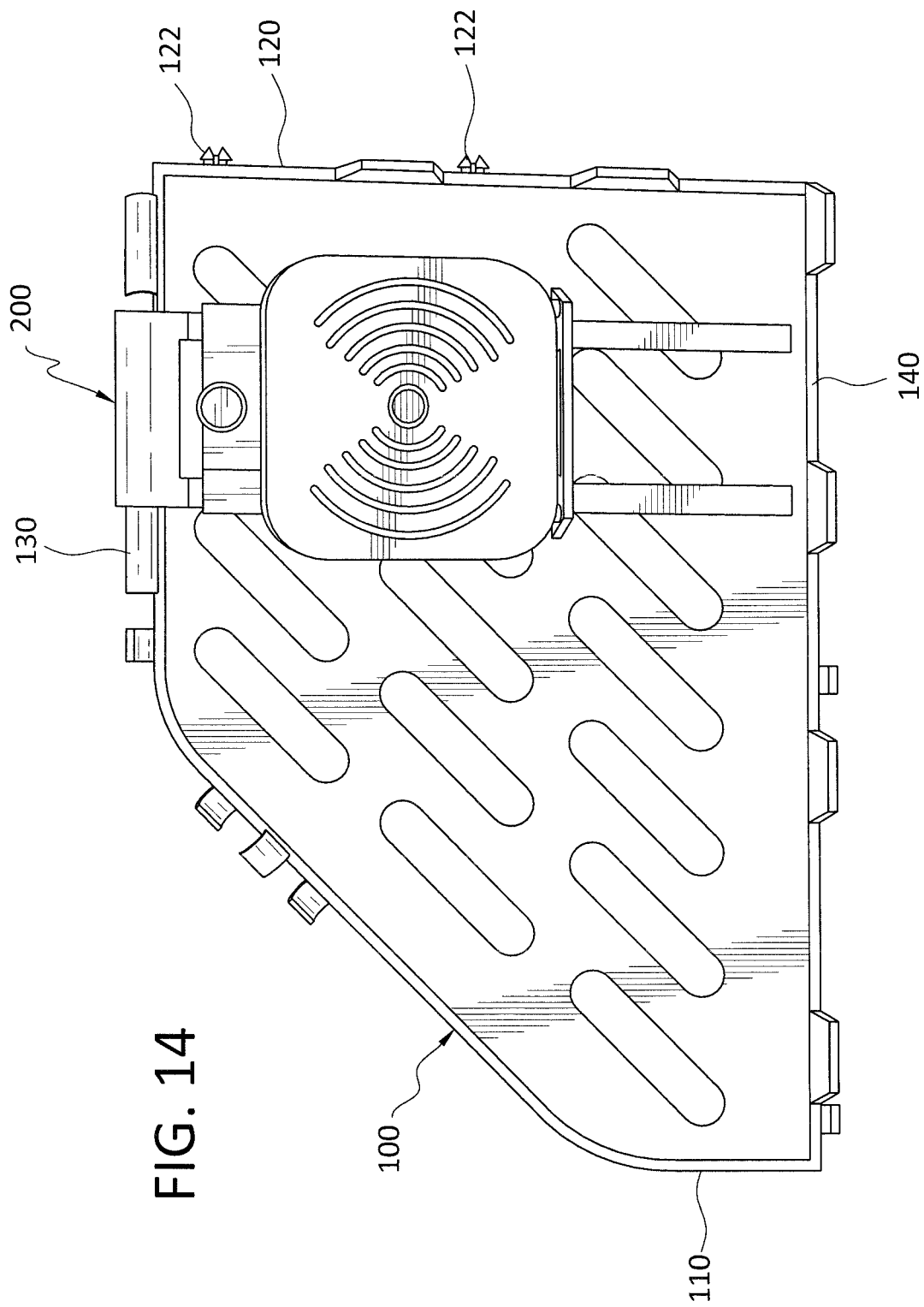

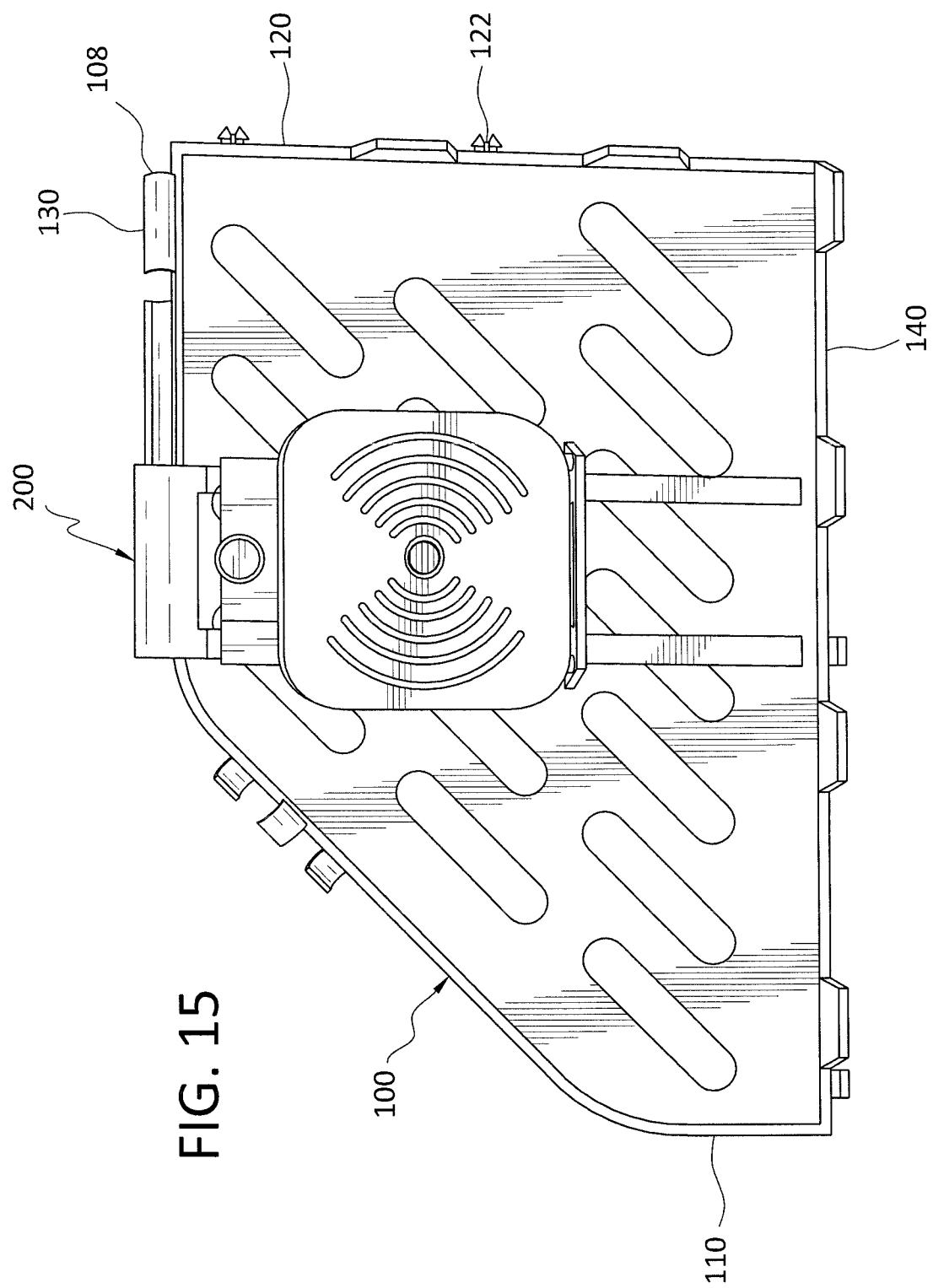

WIRELESS CHARGING CART

BACKGROUND OF THE INVENTION

1. Field of the Invention

The present invention generally relates to charging of portable computing devices using wireless charging, in particular, wireless charging carts.

2. Background of the Invention

By way of background, in work and school environments where many portable computing devices need to get charged, it is cumbersome to maintain them charged as each device needs to be plugged in via a power cable for charging. For example, in a school classroom using 30 portable computing devices, the educator will need to plug in 30 cables in the portable computing devices before leaving the school and remove those 30 cables the next morning prior to the students using the portable computing devices. This requires substantial time and effort by an educator, and the process is prone to mistakes leaving some portable computing devices uncharged the next day. Furthermore, mechanical connectors and wires are likely to experience reliability issues after some usage.

While charging carts such as that disclosed in U.S. Pat. No. 8,066,242 are available to ease this burden, these charging carts still require each individual computing device to be plugged into a wired charger.

Accordingly, a system using wireless charging for a plurality of portable computing devices simultaneously would ease the burden of charging a large number of portable computing devices individually and would create a much improved user experience reducing the work-load while increasing charging reliability. The present invention provides such a system.

SUMMARY OF THE INVENTION

It is, therefore, an object of the present invention to provide a wireless charging cart for charging the battery of portable computing devices having a receiver. The wireless charging cart includes at least one shelf and at least one divider supported by the at least one shelf. The at least one divider has a top edge and a bottom edge between which an x-axis extends and a front edge and rear edge between which a y-axis extends. The wireless charging cart further includes a charging module mounted to the at least one divider. The charging module includes a transmitter mounted to an adjustable support, which permits the transmitter to be moved along both the x and y axis of the at least one divider, wherein the adjustable support is adapted to locate the transmitter adjacent the receiver of the portable computing device to be charged.

It is also an object of the present invention to provide a wireless charging cart which includes a plurality of shelves and a plurality of dividers.

It is another an object of the present invention to provide a wireless charging wherein the adjustable support includes a hanger engaging the top edge of the divider.

It is a further object of the present invention to provide a wireless charging cart wherein the adjustable support includes at least one rail extending from the hanger towards the bottom edge of the divider and a carriage which travels up and down the at least one rail and is supported by the at least one rail.

It is also an object of the present invention to provide a wireless charging cart wherein the carriage includes a clamp to secure the carriage at any desired position along the y-axis of the at least one divider.

Other objects and advantages of the present invention will become apparent from the following detailed description when viewed in conjunction with the accompanying drawings.

BRIEF DESCRIPTION OF THE DRAWINGS

FIGS. 13, 14, and 15 show the charging module at various orientations along the divider.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

Figure 1:
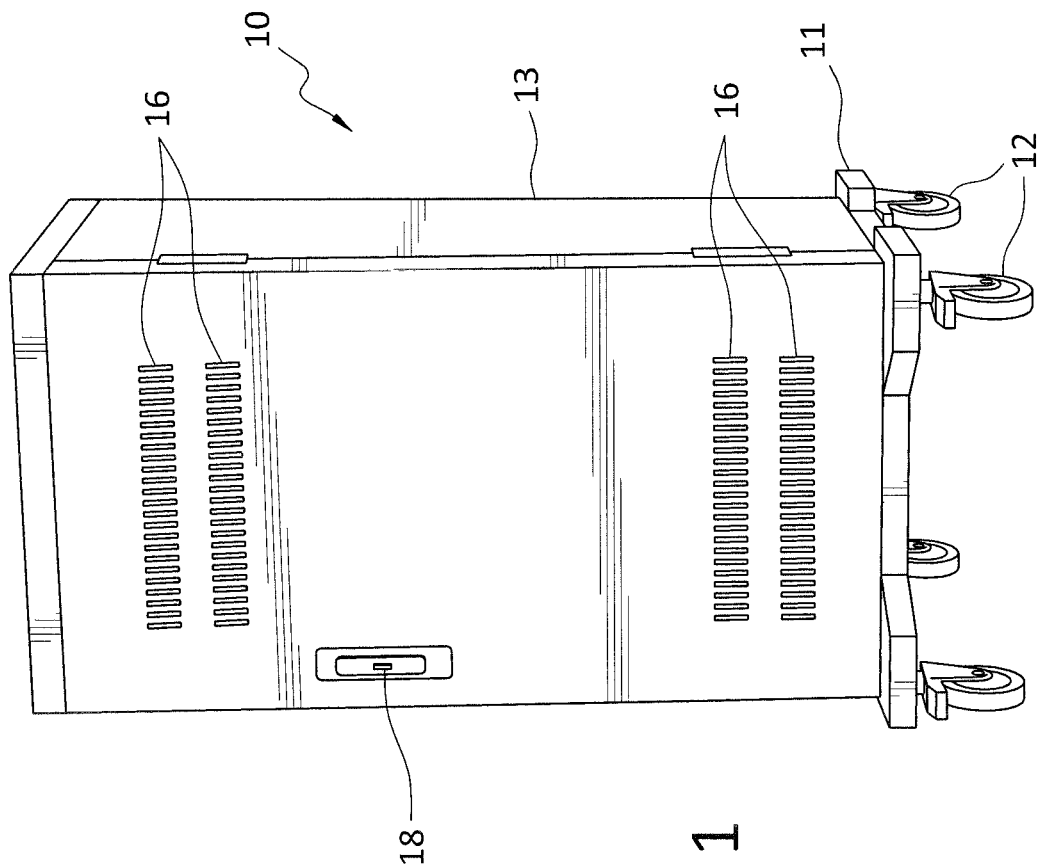
FIG. 1 is a perspective view of the wireless charging cart.
Figure 2:
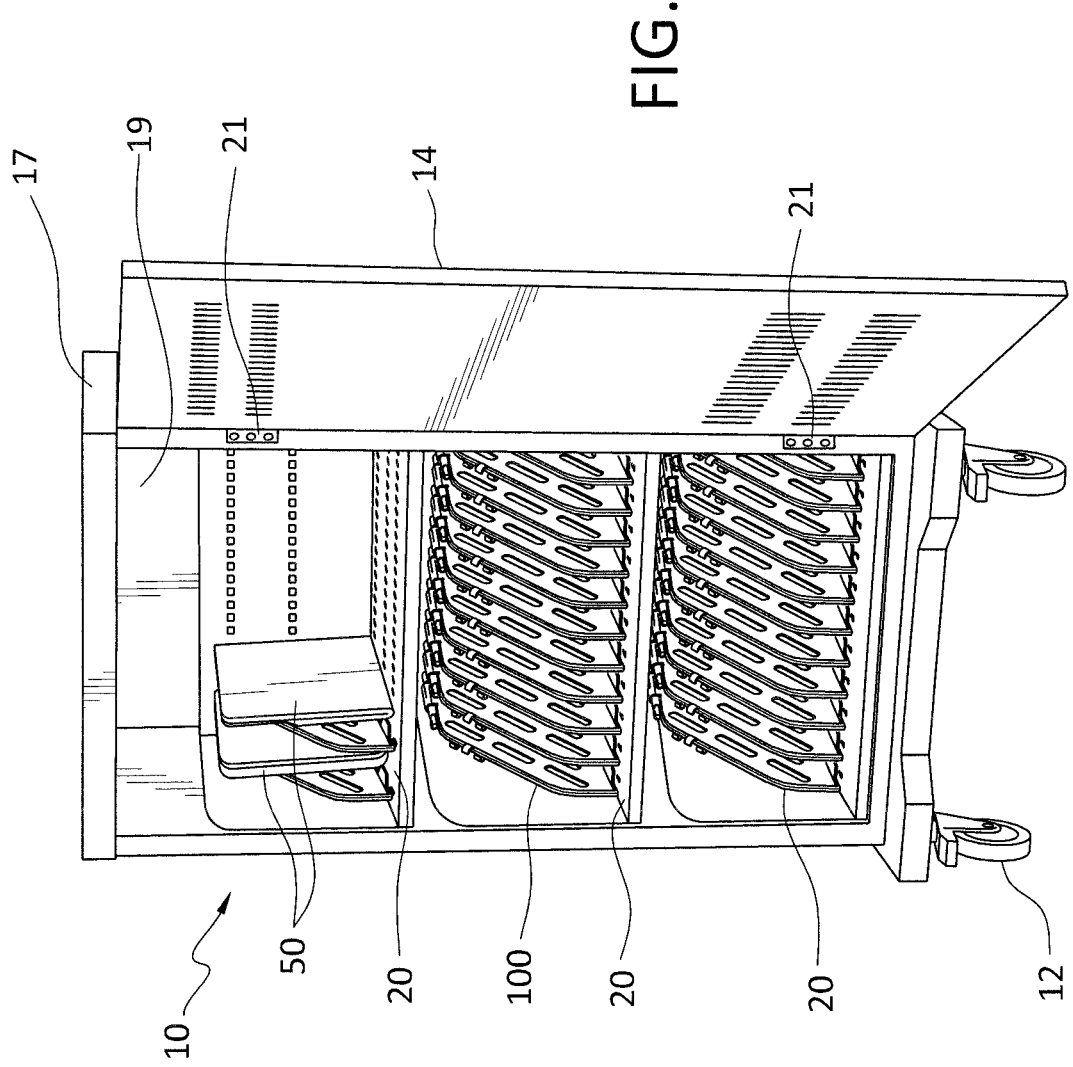
FIG. 2 is a perspective view of the wireless charging cart with the door open.
Figure 3:
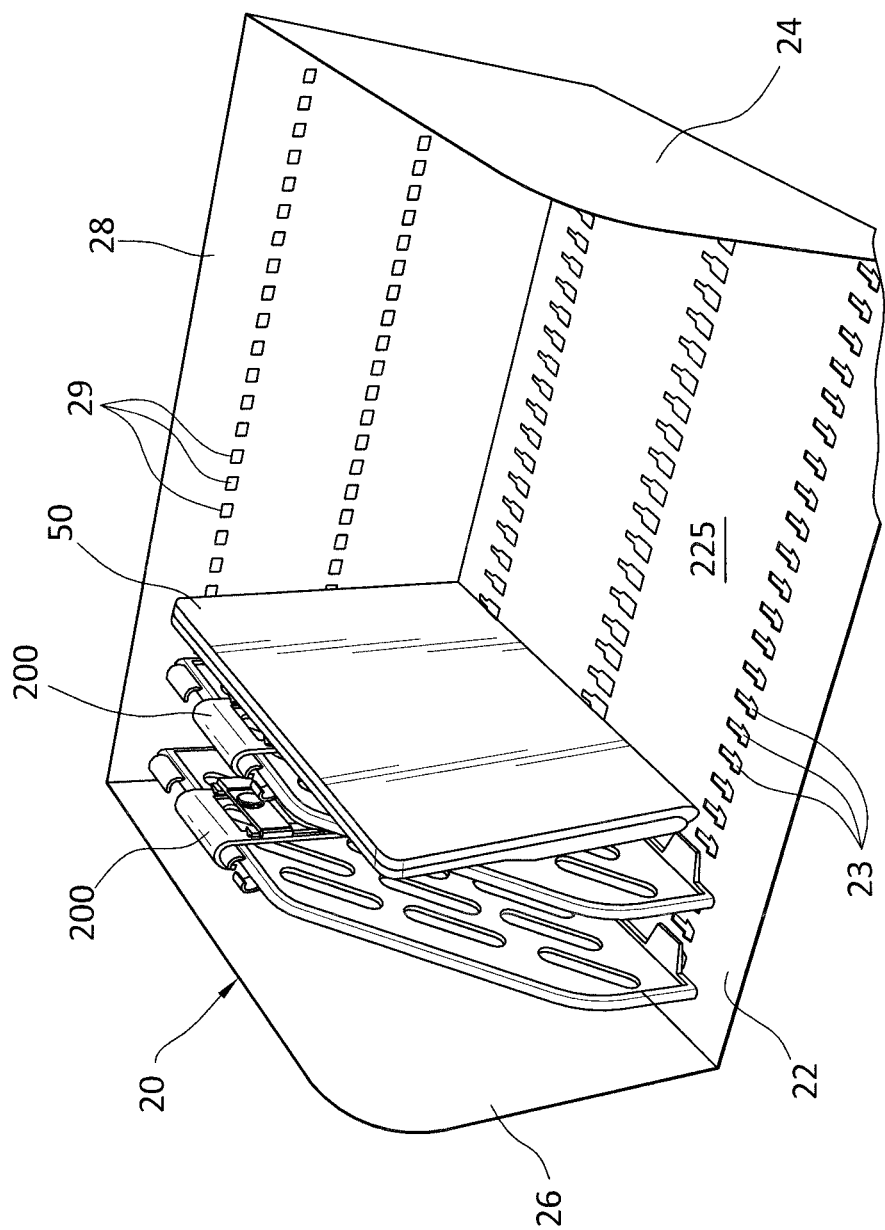
FIG. 3 is a perspective view of a shelf for use in conjunction with the wireless charging cart showing a portable computing device leaning against a charging module.

Referring to FIGS. 1 to 3, a wireless charging cart 10 in the form of a wheeled cabinet is shown. The wireless charging cart 10 includes wheels 12 extending from a base 11 which permits the wireless charging cart 10 to be easily moved about a building. The wireless charging cart 10 further includes an enclosure composed of opposed first and second sidewalls 13, 15 extending upward from the base 11, a rear wall 19 extending between the sidewalls 13, 15, a top wall 17 extending over the sidewalls 13, 15 and the rear wall 19. A door 14, which when shut closes the cavity defined by the enclosure, is pivotally attached to the first sidewall 13 via hinges 21. The door 14 includes vent holes 15 and a handle 16 which can be locked closed.

Located within the enclosure and between the first and second sidewalls 13, 15 are a plurality of shelves 20. Each of the shelves 20 includes a bottom wall 22, opposed sidewalls 24, 26, and a rear wall 28 extending between the opposed sidewalls 24, 26. The sidewalls 24, 26 are removably attached to the first and second sidewalls 13, 15, respectively. The bottom wall 22 and the rear wall 28 include a series of apertures 23, 29, respectively. The series of apertures 23, 29 are oriented along the length of the shelf 20 and function to support dividers 100 at locations spaced from one another depending on the thickness of each portable computing device 50 to be charged.

The wireless charging cart 10 is universal in that it can simultaneously charge the batteries of numerous different types and brands of portable computing devices 50. For example, the portable computing device 50 could be, but is not limited to, a laptop, Chromebook®, or tablet manufactured by different OEMs.

Figure 4:
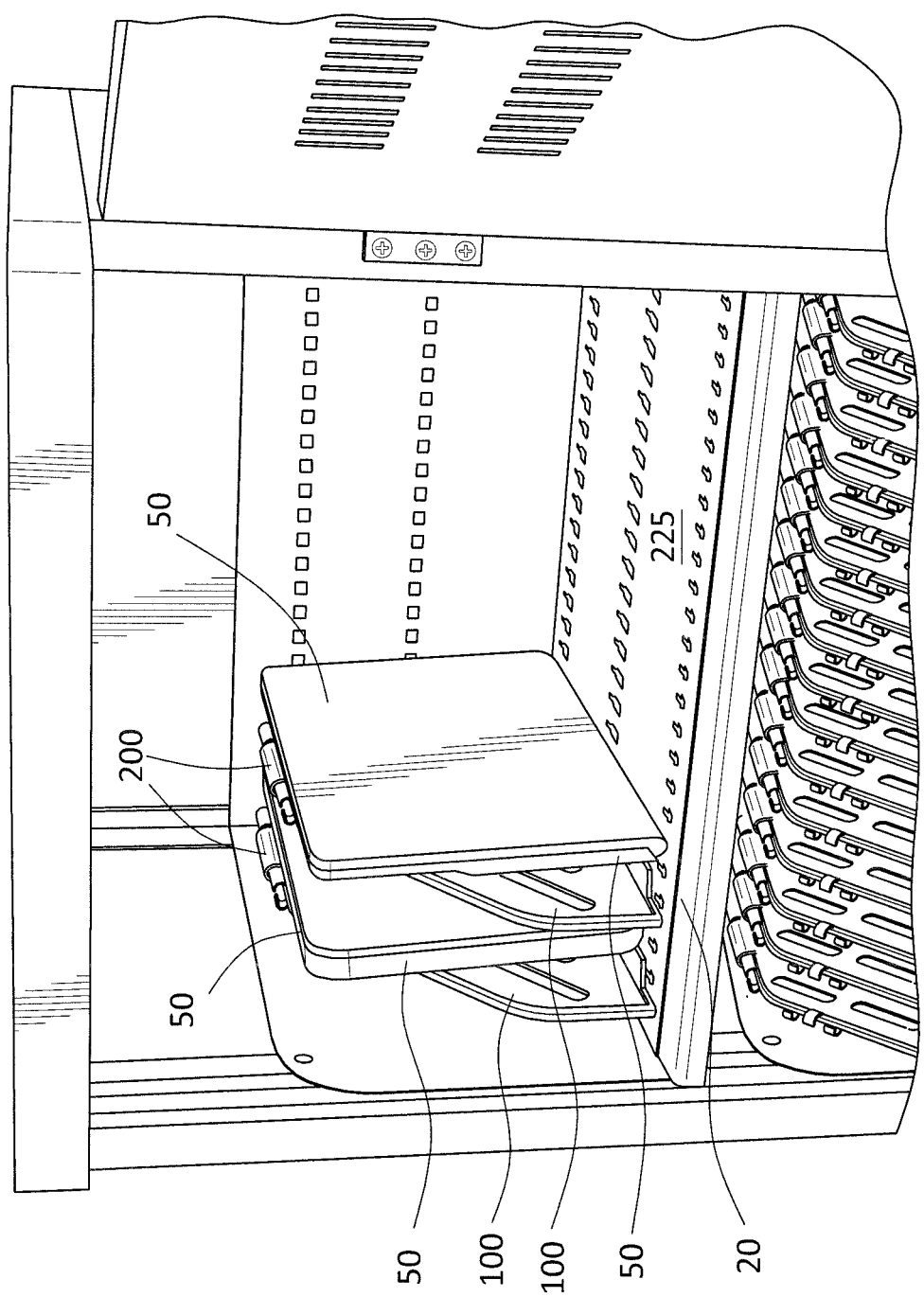
FIG. 4 is a perspective view of a shelf within the wireless charging cart showing two different portable computing devices leaning against respective charging modules.
Figure 5:
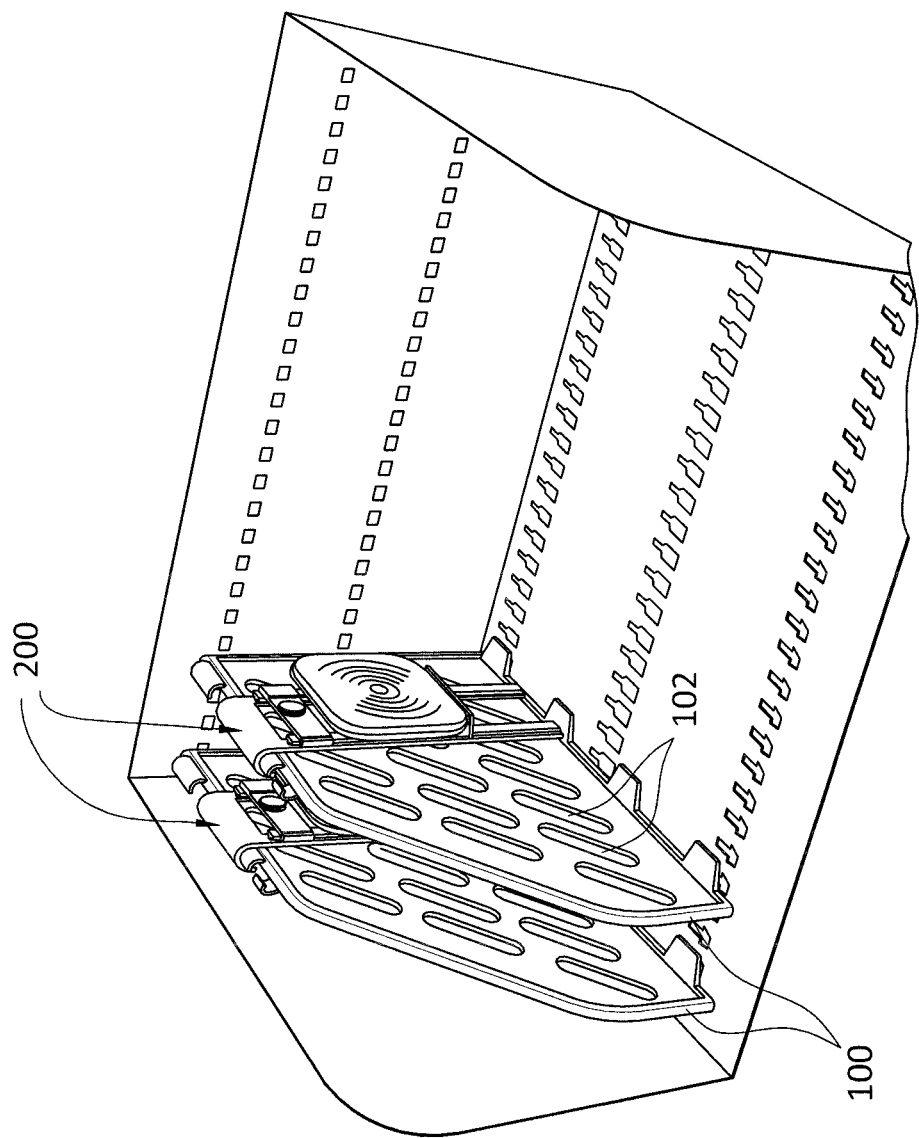
FIG. 5 is a top perspective view showing the shelf of FIG. 4 with the portable computing devices removed.

As shown in FIG. 4, different portable computing devices 50 can be positioned on a shelf 20 for charging. The portable computing devices 50 are separated from each other by the dividers 100. As shown in FIG. 5, each divider 100 functions to support a charging module 200 which will be discussed in greater detail below.

Simultaneous wireless charging of numerous portable computing devices 50 stored within the wireless charging cart 10 results in heat building up within the wireless charging cart 10. Accordingly, each of the dividers 100 includes apertures 102 to maximize air flow around the portable computing devices 50. Additionally, the dividers 100 are made from plastic so as to not retain heat.

The dividers 100 are generally planar and include a front edge 110, a rear edge 120, a top edge 130, and a bottom edge 140 and a sidewall 109 which extends with the bounds defined by the respective divider edges, 110, 120, 130 & 140. The front edge 110 includes a first portion 110a extending upward and perpendicular from the bottom edge 140, and a second portion 110b which extends from the first portion 100a at an oblique angle and runs up to the top edge 130. The bottom edge 140, the rear edge 120 and the top edge 130 are generally linear. As will be appreciated based upon the following disclosure, the top edge 130 includes a wire path 108, the rear edge 120 includes rearwardly extending projections 106 shaped and dimensioned for selective engagement with the apertures 29 along the rear wall 28 of the shelves 20, and the bottom edge 140 includes downwardly extending legs 104 shaped and dimensioned for selective engagement with the apertures 23 along the bottom wall 22 of the shelves 20. In particular, the legs 104 function to extend through the apertures 23 to attach each divider 100 to the shelf 20 such that bottom edge 140 of each divider 100 rest upon the bottom wall 22 of the shelf 20 and the rearwardly extending projections 106 function to extend through the apertures 29 on the rear wall 28 of the shelf 20 when positioned within the wireless charging cart 10. The rearward extending projections 106 may be threaded and attached to the rear wall 28 via wing nuts 122.

Figure 6:
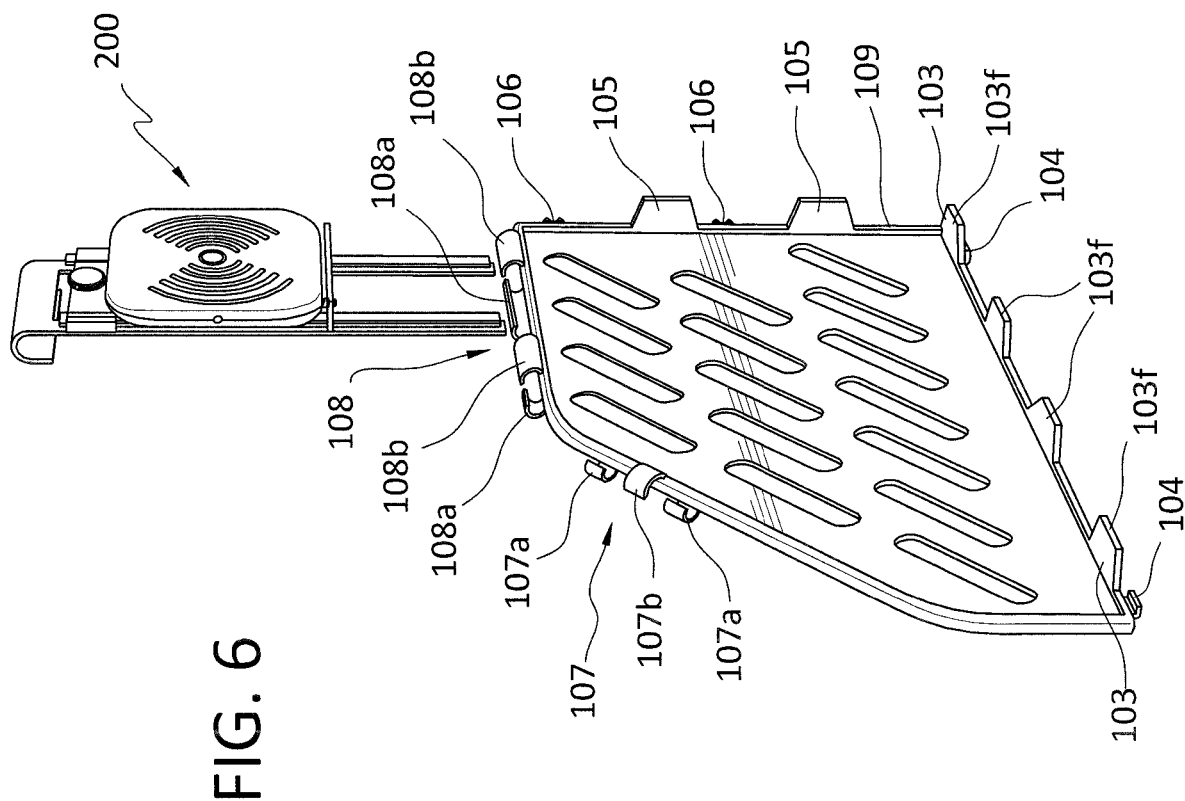
FIG. 6 is an exploded view of the charging module and the divider.

As best seen in FIG. 6, each of the dividers 100 also includes lateral support feet 103. The lateral support feet 103 extend perpendicularly from the plane in which the sidewall 109 of the divider 100 lies and are located adjacent to the bottom edge 140 of the divider such that the lateral support feet 103 rest upon the upper surface 22s of the bottom wall 22 of shelf 20 when positioned within the wireless charging cart 10. The lateral support feet 103 extend perpendicular from the plane in which the divider 100 lies a sufficient distance to assist in angling the portable computing device 50. Each of the lateral support feet 103 includes an upper surface 103u, a bottom surface 103b, and a front face 103f extending between the upper surface 103u and the bottom surface 103b at a location opposite the connection point between the lateral support feet 103 and the bottom edge 140. In accordance with a first embodiment, the portable computing device 50 contacts the front face 103f of the lateral support feet 103 to cause the portable computing device 50 to tilt into contact with the transmitter 202. In accordance with a second embodiment discussed below with regard to FIGS. 16 and 17, the upper surface 103u is tapered (in particular, formed at an acute angle relative to the plane in which the divider 100 lies) to cause the portable computing device 50 resting thereon to tilt toward the divider 100 and into contact with the transmitter 202.

Each of the dividers 100 also includes lateral arms 105 at the rear edge 120 of the divider 100. The lateral arms 105 extend perpendicularly relative to the plane in which the sidewall 109 of the divider 100 lies and rest against the rear wall 28 of the shelf 20 when positioned within the wireless charging cart 10.

Figure 7:
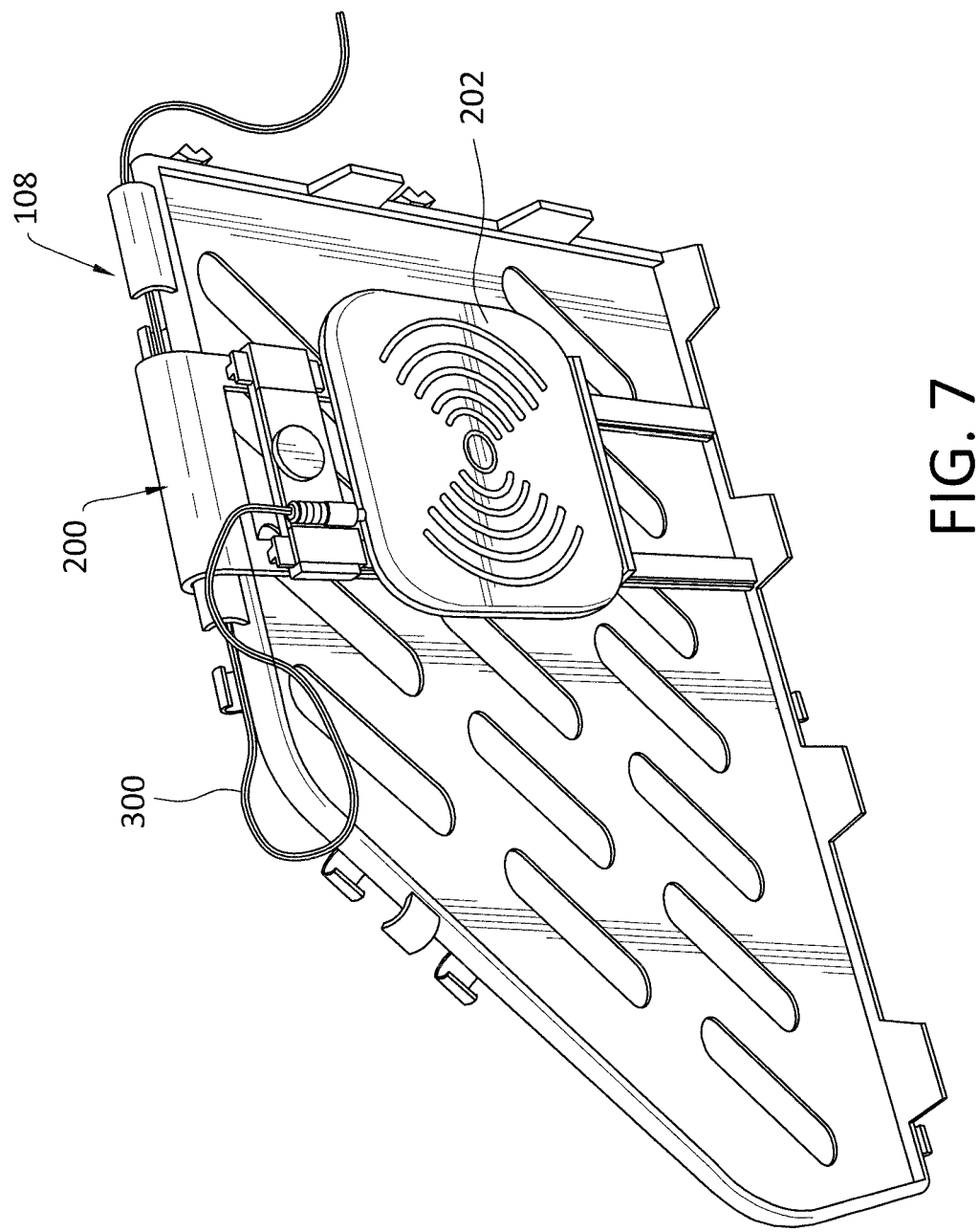
FIG. 7 is a perspective view of the divider with the charging module secured thereto.

Each of the dividers 100 also includes a front wire path 107 and a top wire path 108. The front wire path 107 is formed by staggered and opposed arcuate members 107a, 107b and the top wire path 108 is formed by staggered and opposed arcuate members 108a, 108b. Arcuate members 107a and 108a curve in the same direction whereas arcuate members 107b and 108b curve in the opposite direction thus forming wire paths 107, 108 as an open tube through which a wire 300 can be weaved as shown in FIG. 7

Wireless charging requires a transmitter to communicate with a receiver associated with each portable computing device 50 being charged. The proximity of the transmitter to the receiver is important as the closer the transmitter is located adjacent the receiver the more efficient the energy transfer occurs, and with less generation of heat. This maximizes the transfer of energy and reduces the amount of heat generated during charging. Accordingly, and as mentioned above, a charging module 200 is supported on each divider 100. The charging module 200 permits a user to the position the transmitter 202 adjacent the receiver (not shown) associated with the portable computing device 50 to be charged. For example, the receiver associated with a tablet may be in the middle of its housing whereas the receiver associated with a laptop may be in the upper righthand corner of the device.

Figure 8:
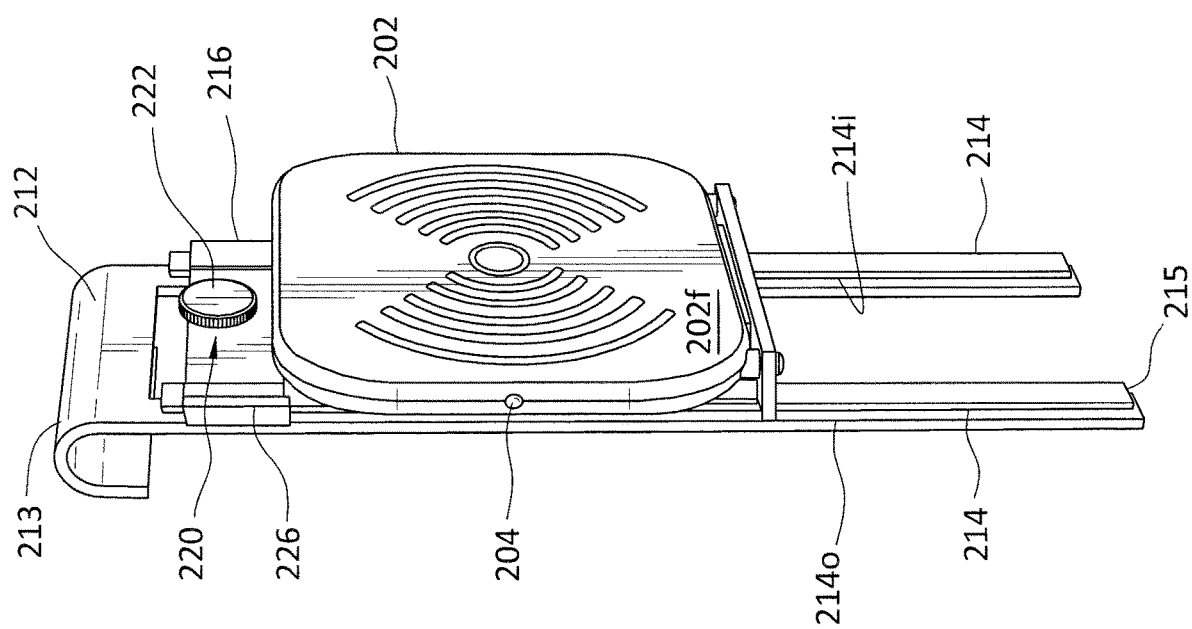
FIG. 8 is a perspective view of the charging module.
Figure 9:
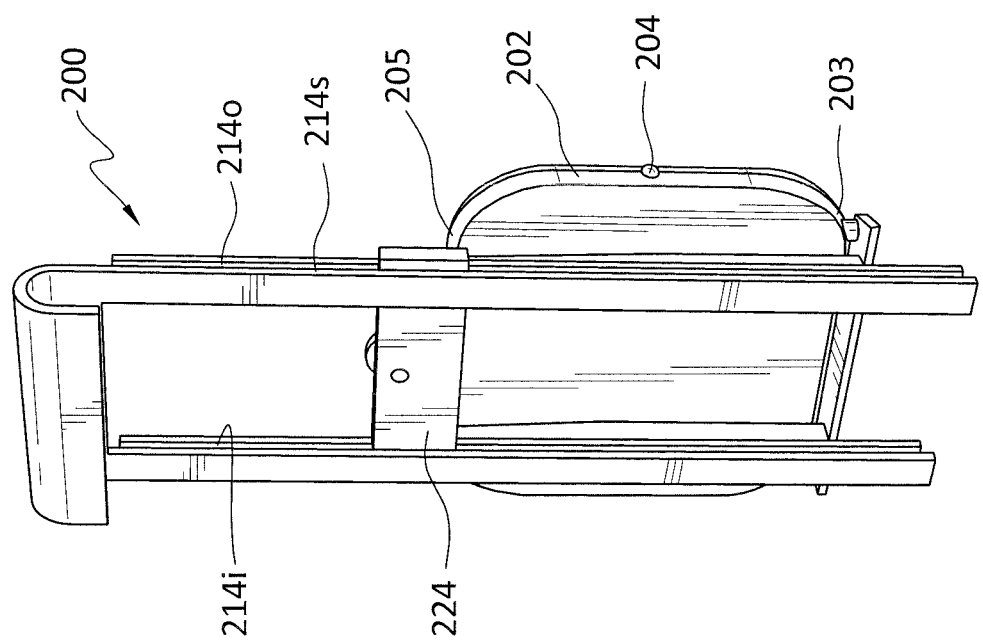
FIG. 9 is a rear perspective view of the charging module.
Figure 10:
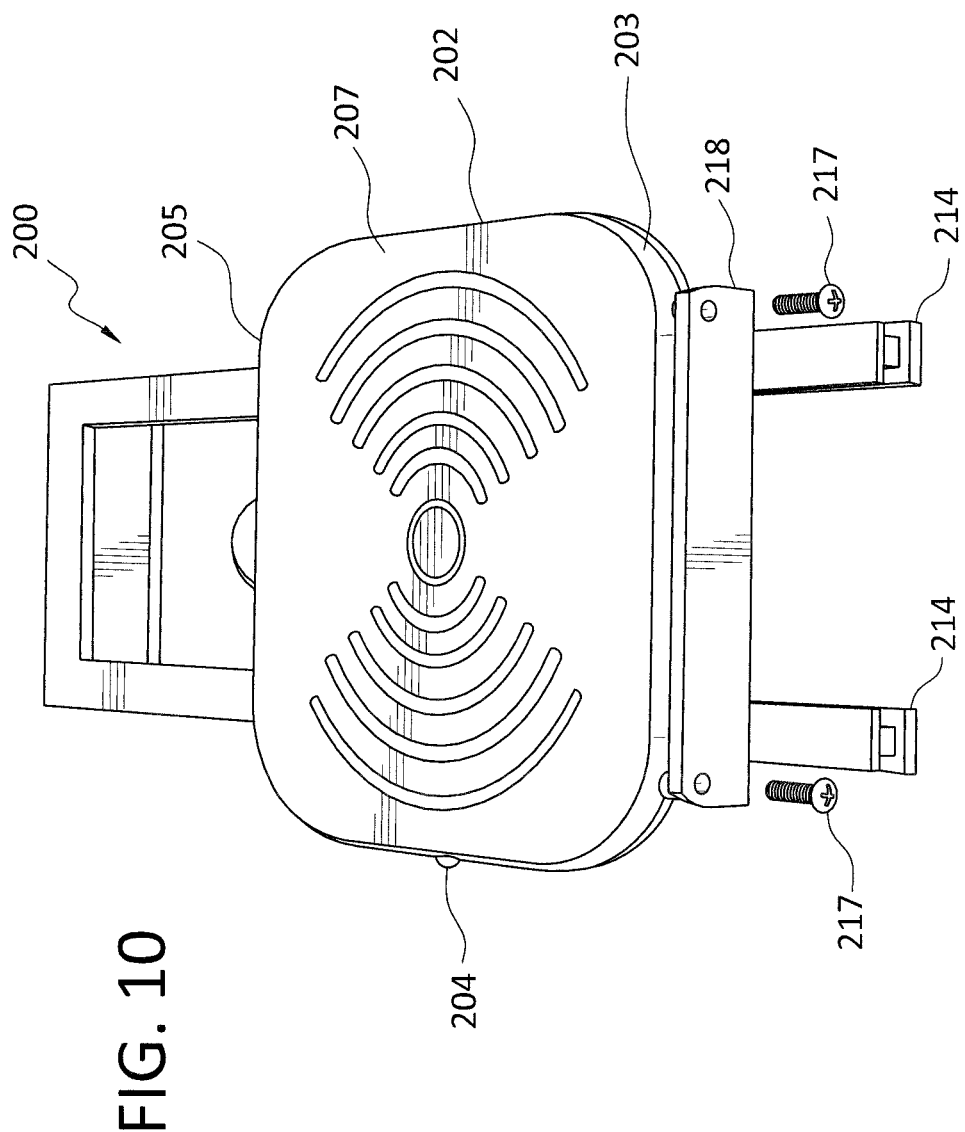
FIG. 10 is a bottom perspective view of the charging module.

With reference to FIGS. 8 to 10, the charging modules 200 are described. Charging module 200 includes a transmitter 202 mounted to an adjustable support 210. The transmitter 202 includes an LED light 204 which glows red when not in communication with a receiver and glows green when in communication with a receiver to indicate the portable computing device 50 associated therewith is being charged. As shown in FIG. 7, a wire 300 transmits power from a junction box (not shown) to the transmitter 202. The wire 300 runs through the wire path 108 and extends through the rear wall 28 to the junction box (not shown) attached to the outer surface of the rear wall 28.

The adjustable support 210, as best seen in FIG. 8, includes a hanger 212 in the shape of an upside down "U" at the first upper end 213 of the charging module 200. The internal curvature of the hanger 212 is slightly larger than the arcuate members 108a, 108b forming wire path 108 so as to slide thereon. Extending from the hanger 212 are a pair of spaced rails 214 which extend down to the second opposite end 215 of the charging module 200. The rails 214 support a carriage 216 which travels up and down the rails 214 along the y-axis. Screws 217 secure the transmitter 202 to the carriage 216 such that the front surface 202f of the transmitter 202 is oriented at an oblique angle relative to the rails 214 and/or the carriage 216, as best shown in FIG. 10. The screws 217 extend through the base 218 of the carriage 216 and into the transmitter housing 207. Thus, the bottom 203 of the transmitter housing 207 extends further away from the rails 214 and/or the carriage 216 then the top 205 of the transmitter housing 207. The angular orientation of the transmitter front surface 202f can be created in several ways. The transmitter housing 207 can be formed at an angle, the screw holes in the transmitter housing 207 can be located closer to the rear of the transmitter housing 207, or the carriage 216 may be wedge shaped proximate the bottom 203 of the transmitter housing 207.

The rails 214 are in the shape of an I-beam and include an inner slot 214i and an outer slot 214o. The carriage 216 includes a clamp 220 including a threaded knob 222. The clamp 220 includes a rectangular back plate 224 which slides in inner slots 214i and a rectangular front plate 226 which extends beyond sides 214s of the rails 214. In operation, the knob 222 is loosened allowing the front plate 226 and the back plate 224 to slide in the slots 214i, 214o thus permitting the carriage 216 to be moved up and down to the desired position. Once at the desired position the knob 222 is tightened causing the front plate 226 and the back plate 224 to move toward each other to pinch a portion of the rails 214 between the front plate 226 and the back plate 224, thereby clamping the carriage 216 in place. When the knob 222 is turned clockwise the rear plate 224 moves closer to the front plate 226 and pinches the rails 214 therebetween.

Figure 17:
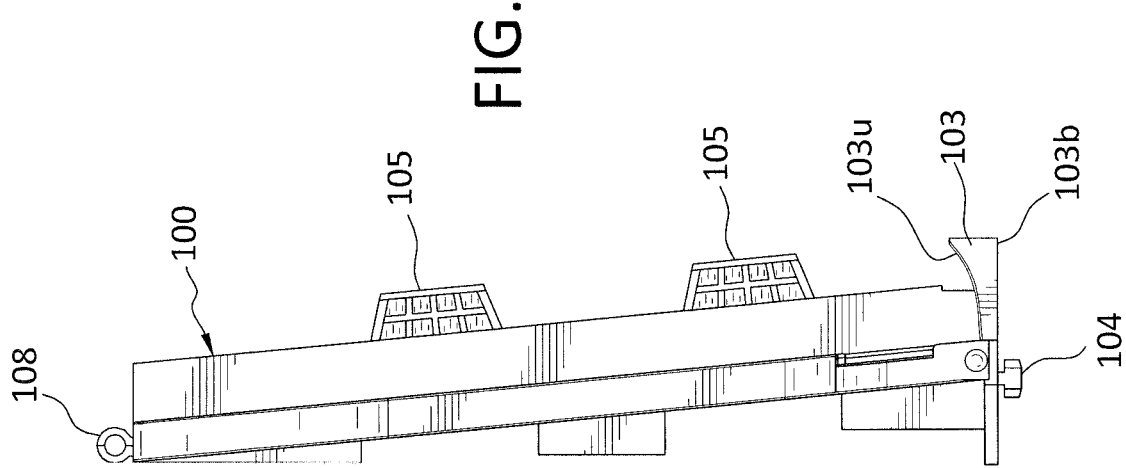
FIGS. 16 and 17 are respectively a rear view and a front view of a divider in accordance with an alternate embodiment of the present invention.
Figure 16:
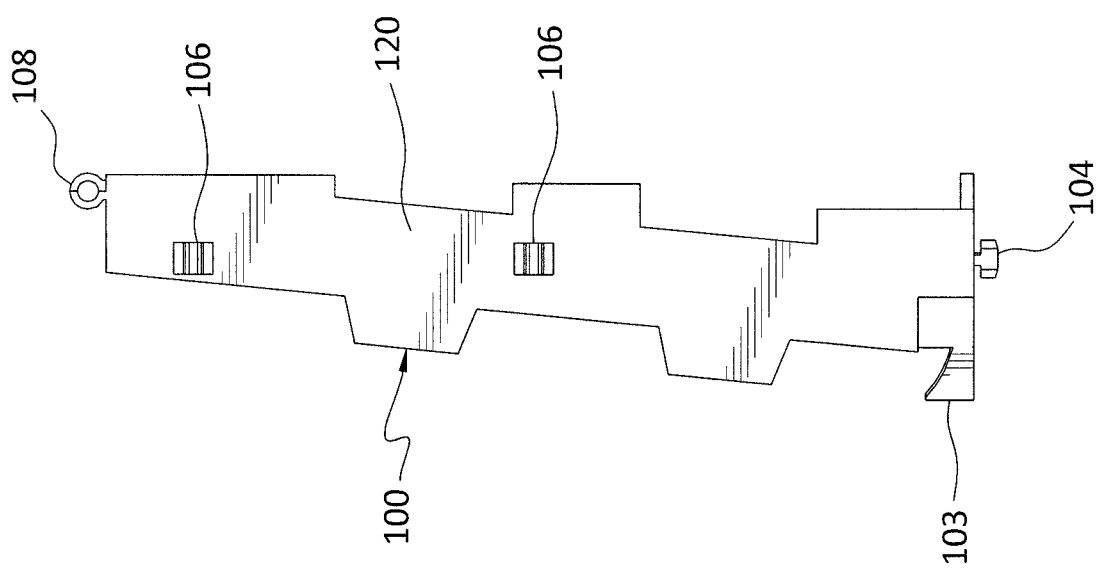

As shown in FIGS. 16 and 17, and as discussed above, the feet 103 may also include an angled upper surface 103u which extends a distance from the sidewall 109 of the divider 100 to support the portable computing device 50 thereon. The angled upper surface 103u causes the portable computing device 50 to tilt into contact with the transmitter 202, thus using gravity to maintain contact between the portable computing device 50 and the transmitter 202 during charging, and facilitate optimal charging of the portable computing device 50. Also the divider 100 may be formed at an angle relative to the bottom edge 140 of the divider 100 which further assist in tilting of the portable computing device 50 and the use of gravity to a to maintain contact between the portable computing device 50 and the transmitter 202 during charging. As shown in FIG. 16, the rearward extending projections 106 may be formed as rectangular snaps which snap into the apertures 29 in the rear wall 28 of the shelf 20.

The charging module 200 may be moved back and forth along the divider 100 along the x-axis by sliding hanger 212 along wire path 108. This two-axis movement of the charging module 200 allows the position of the transmitter 202 to be adjusted to match the location of the receiver associated with the portable computing device 50 being charged. Once again, the two-axis movement results in the wireless charging cart 10 being capable of efficiently charging a plurality of different forms of portable computing devices 50.

Figure 11:
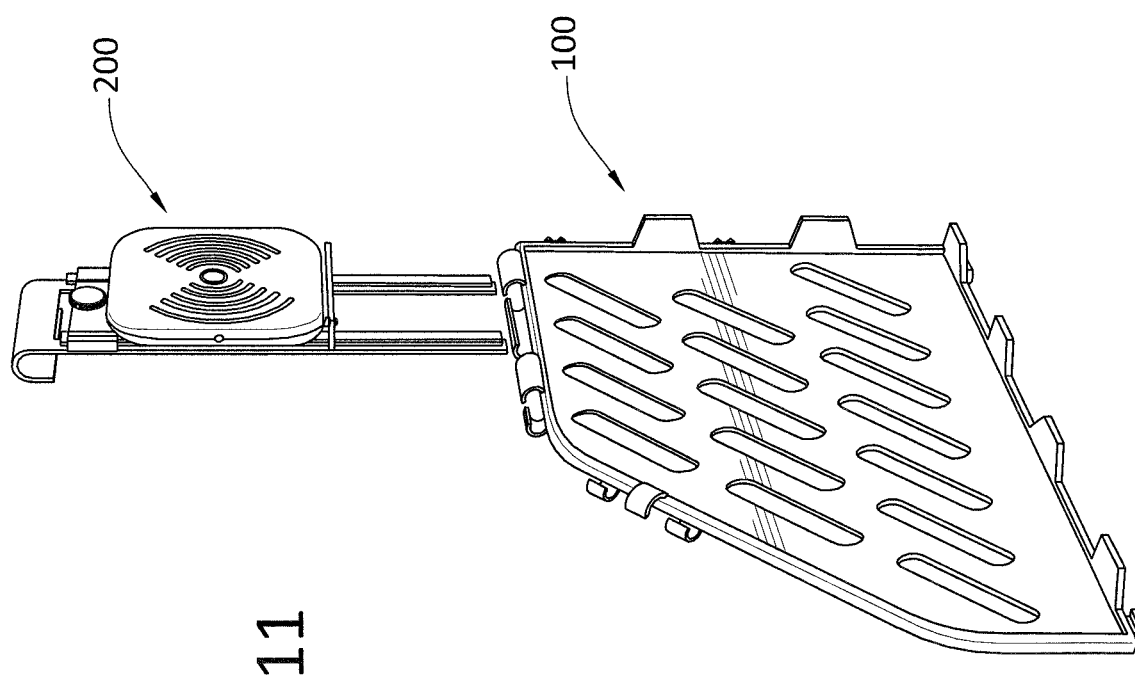
FIGS. 11 and 12 show the process of hanging a charging module upon a divider.
Figure 12:
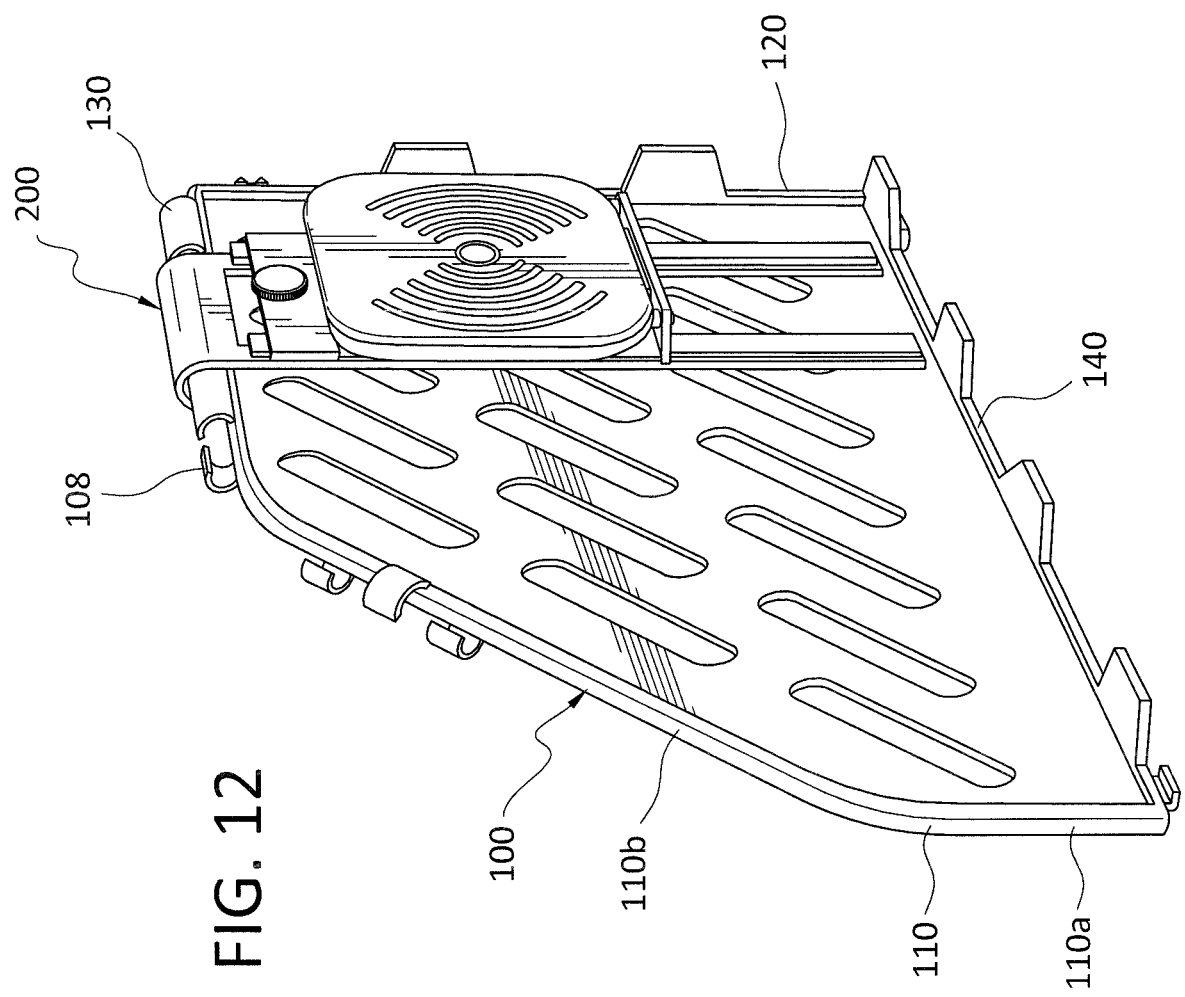
Figure 13:
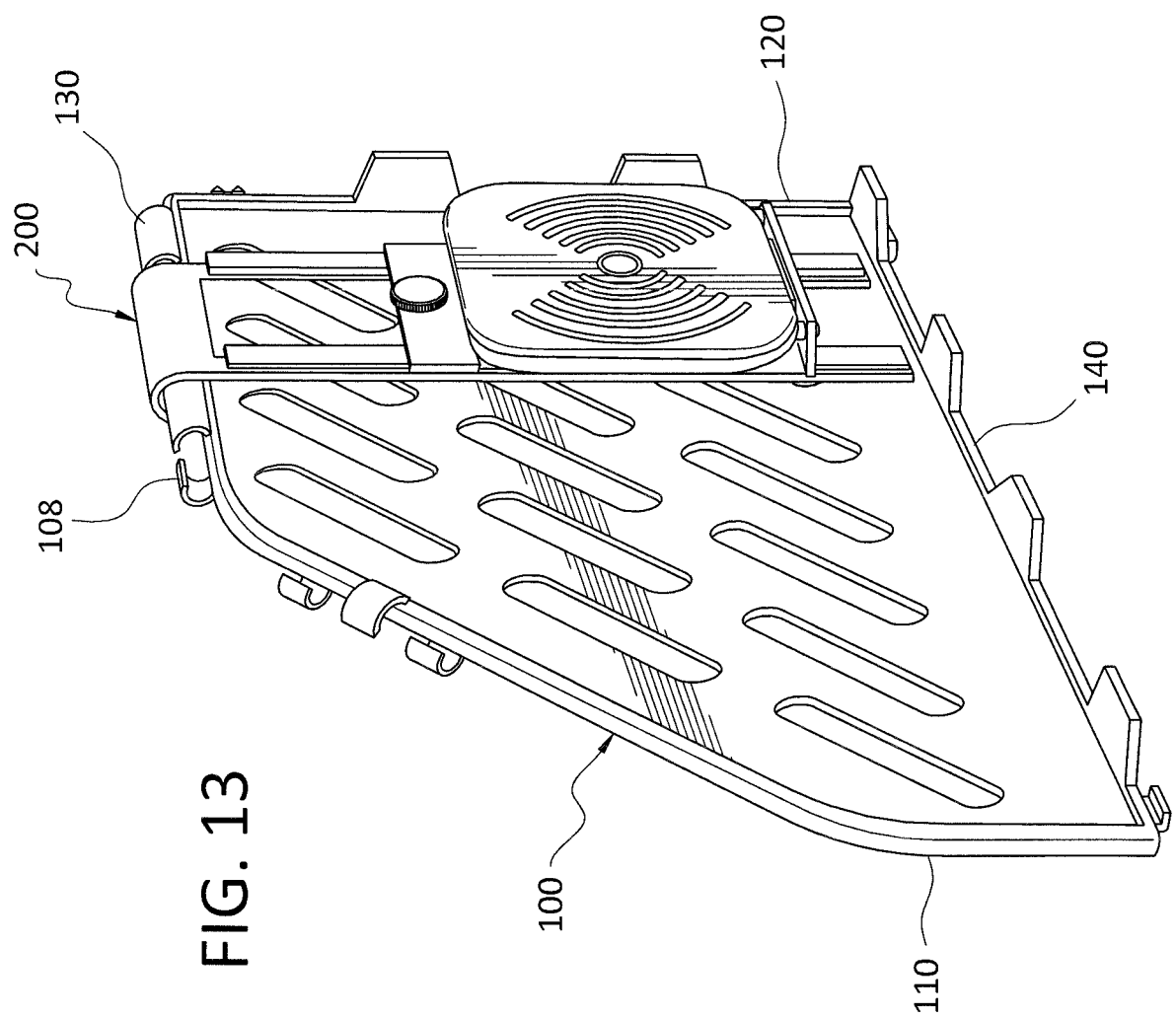

FIG. 10 shows the charging module 200 being assembled onto a divider 110. FIGS. 11 to 15 show various positions in which the changing module 200 can be positioned on the divider 100. In FIG. 11 the changing module 200 is about to be placed on the divider 100. FIG. 12 shows the charging module 200 hung on divider 100 near rear edge 120 of divider 100 with the carriage 216 holding the transmitter 202 closer to upper edge 130 of divider 100 than lower edge 140 of the divider 100. FIG. 13 shows the carriage 216 in FIG. 12 being moved closer to lower edge 140 of divider 100. FIGS. 14 and 15 show the charging module 200 being moved from rear to front along the wire path 108 forming the upper edge 130 of divider 100.

While the embodiments disclosed above relate to the use of the charging modules in conjunction with the manufacture of a complete wireless charging cart, it is appreciated the charging modules could be used to retrofit an already existing charging cart.

While the preferred embodiments have been shown and described, it will be understood that there is no intent to limit the invention by such disclosure, but rather, it is intended to cover all modifications and alternate constructions falling within the spirit and scope of the invention.

The invention claimed is:

1. A wireless charging cart for charging the battery of portable computing devices having a receiver, comprising:
   at least one shelf;
   at least one divider supported by the at least one shelf, the at least one divider having a top edge and a bottom edge between which an x-axis extends and a front edge and rear edge between which a y-axis extends;
   a charging module mounted to the at least one divider, the charging module including a transmitter mounted to an adjustable support, which permits the transmitter to be moved along both the x and y axis of the at least one divider;
   wherein the adjustable support is adapted to locate the transmitter adjacent the receiver of the portable computing device to be charged.

2. The wireless charging cart according to claim 1, including a plurality of shelves and a plurality of dividers.

3. The wireless charging cart according to claim 1, wherein the adjustable support includes a hanger engaging the top edge of the divider.

4. The wireless charging cart according to claim 3, wherein the adjustable support includes at least one rail extending from the hanger towards the bottom edge of the divider and a carriage which travels up and down the at least one rail and is supported by the at least one rail.

5. The wireless charging cart according to claim 4, wherein the carriage includes a clamp to secure the carriage at any desired position along the y-axis of the at least one divider.

* * * * *